Jan. 12, 1926.
A. ROBINSON
ORIFICE FITTING
Filed May 19, 1924
1,569,305
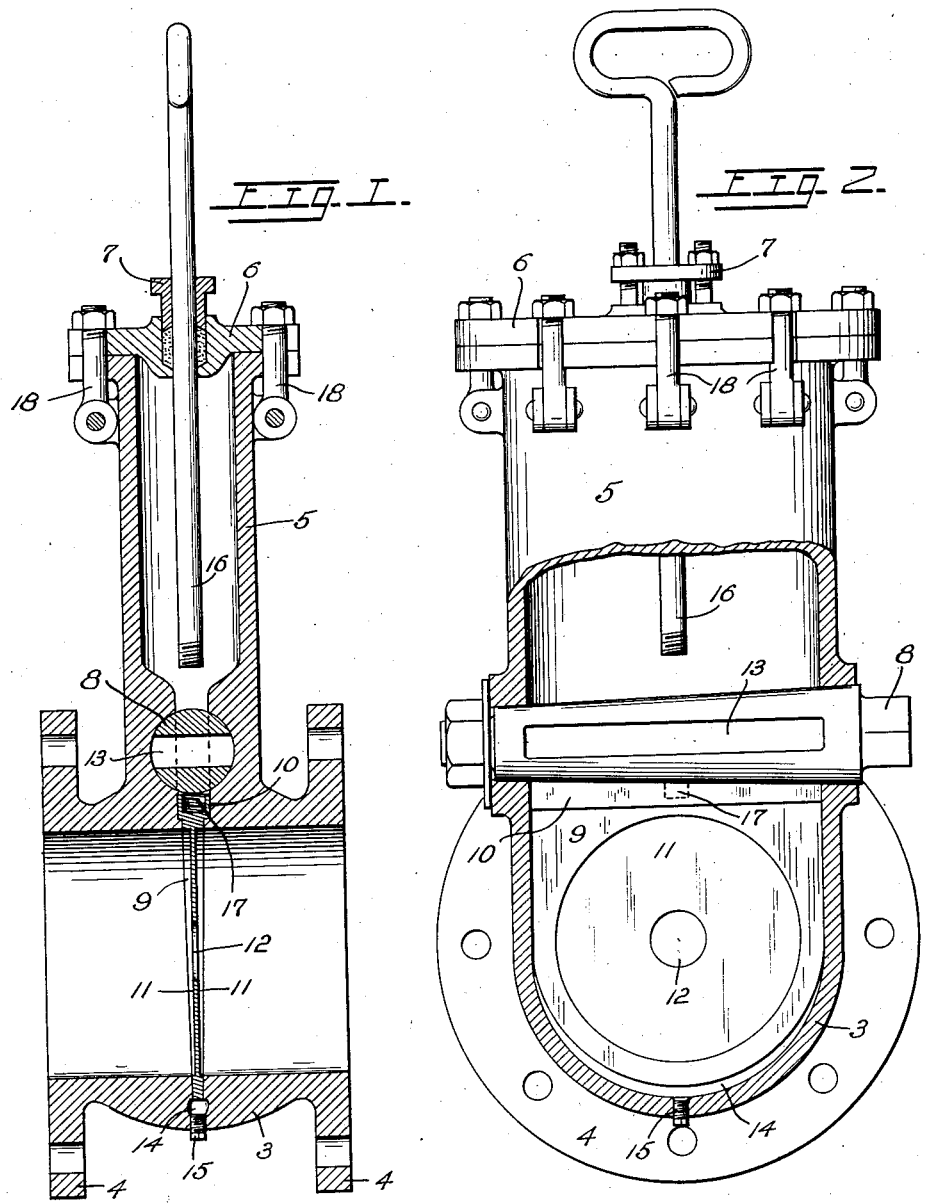
Inventor;
Anson Robinson,
per Arthur J. Farnsworth.
Attorney.

Patented Jan. 12, 1926.

1,569,305

UNITED STATES PATENT OFFICE.

ANSON ROBINSON, OF LOS ANGELES, CALIFORNIA.

ORIFICE FITTING.

Application filed May 19, 1924. Serial No. 714,344.

*To all whom it may concern:*

Be it known that I, ANSON ROBINSON, a citizen of the United States, residing at Los Angeles, in the county of Los Angeles and State of California, have invented a new and useful Orifice Fitting, of which a specification is set forth below.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to metering orifices and among its salient objects are: first, to provide a fitting adapted for installation in a pipe line in which standard orifices may be selectively inserted in a convenient manner; second, to afford facilities for changing orifices at will, without breaking the line or interfering with the flow of fluids therein; third, to make it possible to change orifices without permitting any appreciable amount of the fluid in the pipe line to escape; and, fourth, to accomplish the above by means of a very simple, dependable, and relatively inexpensive construction.

My objects are attained in the manner illustrated in the accompanying drawing, in which—

Figure 1 is a central section of the device in elevation, taken on a plane containing the axis of the pipe line, and Figure 2 is an elevational view, shown partly in central section, on a plane perpendicular to the axis of the pipe line.

Similar reference numerals refer to similar parts throughout both views.

In the measurement of fluids by means of orifices it is well known that the orifice should be centered with its axis perpendicular to the line of flow, and that variations in the diameter and shape of the flow passages should be avoided except at the orifice itself. It is also well known that to secure accurate measurements a very much smaller orifice must be used at low velocities than is required at high velocities. Where the periodic variations of flow are considerable it becomes necessary therefore to change orifices from time to time to secure the desired accuracy in the metering. During the change it is usually essential to maintain an uninterrupted flow of the fluid and, obviously, it is desirable to accomplish the substitution of orifices quickly and with as little loss of fluid as possible. These and other considerations of a similar nature have been provided for fully in my improved construction.

My invention comprises an orifice body 3, which is here shown as flanged at 4, for making up permanently in a pipe line. It is provided with a flattened transverse neck 5 having a bonnet 6, and stuffing box and gland 7. Near the base of the neck is a transverse cock plug 8.

The orifice plate 9 is made in the form of a wedge, with rounded bottom and T-shaped, or double flanged, head 10. The top surface of the head is not square with the sides, but is at a slight angle corresponding to the taper of plug 8, as shown in Figure 2. The plate has a shallow counterbore 11 on each side, of the same diameter as the pipe line, and is pierced at the center with an accurately made measuring orifice 12. This plate is introduced through neck 5 and slot 13 in the plug, the latter being turned 90 degrees from the position shown in the drawing for that purpose.

The orifice plate fits in a tapered groove in the body and is positioned by its T-head as shown in Figure 1. After it has been placed it is held by turning plug 8 back to the position shown in the drawing.

The tapered groove in the body has its lower portion under-cut, as shown at 14, and the bottom of the groove is tapped and plugged at 15, to provide a means for blowing out accumulation of solids and other substances that otherwise might interfere with the proper seating of the orifice plate.

For handling the orifice plates I provide a handled rod 16 passing through the stuffing box in the bonnet, and threaded at its lower end. The head of the orifice plate is centrally tapped at 17 for this rod to screw into. I prefer to secure the bonnet by hinged studs 18 to increase the ease and quickness of changing orifice plates.

To remove the orifice from a line under pressure the plug 8 is first given a quarter turn. Rod 16 is then pushed down through slot 13 and screwed into the tapped hole in the head of the orifice plate, and the latter is pulled up into the body neck. Plug 8 is then turned back to its original position, bonnet 6 is removed, and the orifice plate is withdrawn. For inserting an orifice the above steps are reversed.

The advantages of my invention will be apparent from the foregoing description to those accustomed to using devices of this general nature. There is no need of by-passing the flow for changing orifices, and the expense and space required for three by-pass valves and connections is entirely eliminated. The flow line never requires breaking and the flow never needs to be interrupted for this purpose. In the case of liquid lines there is no loss whatever due to changing orifice plates. In the case of gas lines the loss is confined to the small amount of gas that fills neck 5, and is entirely negligible.

I claim as my invention:

1. An orifice fitting comprising; a body member having a transversely bisected bore therethrough, and an accessible lateral chamber opposite said bisection; a rotatable plug-cock, intermediate said bore and said chamber, having an elongated longitudinal slot therethrough and its axis in the plane of said bisection; a plate having a flow-measuring orifice therethrough, removably inserted in said bisection; and means for withdrawing said plate into said chamber through said slot when said fitting is under internal pressure.

2. An orifice fitting comprising; a body member having a transversely bisected bore therethrough, and an accessible lateral chamber opposite said bisection communicating with said bore; a rotatable plug-cock intermediate said bore and said chamber in said communication, having an elongated longitudinal slot therethrough and its axis in the plane of said bisection; a plate having a flow-measuring orifice therethrough concentric with said bore, removably inserted in said bisection; and means for withdrawing said plate into said chamber through said slot when said fitting is under internal pressure.

3. An orifice fitting comprising; a body member having a transversely bisected smooth cylindrical bore therethrough, and an accessible lateral chamber opposite said bisection communicating with said bore; a rotatable plug-cock intermediate said bore and said chamber in said communication, having an elongated longitudinal slot therethrough and its axis in the plane of said bisection; a plate having a flow-measuring orifice therethrough concentric with said bore, removably inserted in said bisection and adapted for being retained therein by said plug in its closed position; and means for withdrawing said plate into said chamber through said slot when said fitting is under internal pressure.

4. An orifice fitting comprising; a body member adapted for insertion in a pressure pipe line, having a transversely bisected smooth cylindrical bore therethrough, and an accessible lateral chamber opposite said bisection communicating with said bore; an exteriorly rotatable plug-cock intermediate said bore and said chamber in said communication, having an elongated longitudinal slot therethrough and its axis in the plane of said bisection, a plate having a flow-measuring orifice therethrough concentric with said bore, removably inserted in said bisection and adapted for being retained therein by said plug when closed; and a packed rod adapted to extend from the outside into said chamber and through said slot to engage said plate and withdraw it into said chamber.

5. An orifice fitting comprising; a body member adapted for insertion in a pressure pipe line, having a transversely bisected smooth cylindrical bore therethrough, and an accessible lateral chamber opposite said bisection communicating with said bore; an exteriorly rotatable plug-cock intermediate said bore and said chamber in said communication, having an elongated longitudinal slot therethrough and its axis in the plane of said bisection; a plurality of interchangeable plates having flow-measuring orifices of different sizes respectively therethrough, adapted for being severally inserted in said bisection with their orifices concentric with said bore, and for being retained therein by said plug when in its closed position; and means for inserting said plates in said bisection and for withdrawing them into said chamber, through said slot, when said fitting is under internal pressure.

ANSON ROBINSON.